(12) United States Patent
Merchan et al.

(10) Patent No.: US 9,367,701 B2
(45) Date of Patent: Jun. 14, 2016

(54) SYSTEMS AND METHODS FOR MAINTAINING INTEGRITY AND SECRECY IN UNTRUSTED COMPUTING PLATFORMS

(71) Applicant: Robert Bosch GmbH, Stuttgart (DE)

(72) Inventors: Jorge Guajardo Merchan, Pittsburgh, PA (US); Emmanuel Kwame Owusu, Pittsburgh, PA (US); Jonathan McCarrell McCune, Santa Clara, CA (US); James Duran Newsome, Jr., Pittsburgh, PA (US); Amit Vasudevan, Pittsburgh, PA (US); Adrian Perrig, Zurich (CH)

(73) Assignee: Robert Bosch GmbH, Stuttgart (DE)

( * ) Notice: Subject to any disclaimer, the term of this patent is extended or adjusted under 35 U.S.C. 154(b) by 125 days.

(21) Appl. No.: 14/200,695

(22) Filed: Mar. 7, 2014

(65) Prior Publication Data

US 2014/0258736 A1    Sep. 11, 2014

Related U.S. Application Data

(60) Provisional application No. 61/774,641, filed on Mar. 8, 2013.

(51) Int. Cl.
*G06F 21/62* (2013.01)

(52) U.S. Cl.
CPC ........ *G06F 21/62* (2013.01); *G06F 2221/0704* (2013.01); *G06F 2221/2107* (2013.01)

(58) Field of Classification Search
CPC ............ G06F 21/62; G06F 2221/2107; G06F 2221/0704; G06F 21/72; H04L 9/0866; H04L 9/302; H04L 9/3249; H04L 9/3278; H04L 2209/06; H04N 21/26613; H04N 21/4181; H04N 21/4623
See application file for complete search history.

(56) References Cited

U.S. PATENT DOCUMENTS

| 7,681,103 B2* | 3/2010 | Devadas ................. G06F 21/31 714/752 |
| 7,877,604 B2 | 1/2011 | Van Dijk et al. |
| 8,438,398 B2* | 5/2013 | Masushio ............. H04L 63/085 713/178 |

(Continued)

FOREIGN PATENT DOCUMENTS

EP        0706275 A2    4/1996

OTHER PUBLICATIONS

Suh et al., Physical Unclonable Functions for Device Authentication and Secret Key Generation, DAC 2007, Jun. 4-8, 2007, San Diego, California, USA (1ST OA ART1-2 puf-dac07.pdf).*

(Continued)

*Primary Examiner* — Tae Kim
*Assistant Examiner* — Shu Chun Gao
(74) *Attorney, Agent, or Firm* — Maginot Moore & Beck LLP

(57) ABSTRACT

A method for operating a computing system with a trusted processor include generating a secret cryptographic key based on a physically unclonable function in at least one hardware component in the trusted processor, generating a first public key and first private key using first secret cryptographic key, and executing instruction code corresponding to a first software program. The method further includes generating output data with the trusted processor during execution of the first software program, generating encrypted data corresponding to the output data using the first public key for at least a portion of the encryption, generating a signature of the encrypted data, and transmitting with an input/output (I/O) interface operatively connected to the trusted processor the encrypted data and the signature for storage in an untrusted memory.

20 Claims, 10 Drawing Sheets

(56) References Cited

U.S. PATENT DOCUMENTS

| | | | | |
|---|---|---|---|---|
| 8,667,265 | B1* | 3/2014 | Hamlet | H04L 9/0866 326/80 |
| 8,868,923 | B1* | 10/2014 | Hamlet | H04L 9/00 326/8 |
| 2008/0279373 | A1 | 11/2008 | Erhart et al. | |
| 2010/0228999 | A1 | 9/2010 | Maheshwari et al. | |
| 2011/0002461 | A1* | 1/2011 | Erhart | H04L 9/302 380/44 |
| 2013/0051552 | A1* | 2/2013 | Handschuh | G06F 21/602 380/44 |
| 2013/0194886 | A1* | 8/2013 | Schrijen | G06F 7/588 365/226 |
| 2014/0325237 | A1* | 10/2014 | Van Der Leest | G06F 21/72 713/189 |

OTHER PUBLICATIONS

International Search Report and Written Opinion corresponding to PCT Application No. PCT/US2014/021914, mailed Jun. 19, 2014 (9 pages).

Areno, Matthew et al., "Securing Trusted Execution Environments with PUF Generated Secret Keys" 2012 IEEE 11th International Conference on Trust, Security and Privacy in Computing and Communications, Jun. 2012, pp. 1188-1193 (6 pages).

Guajardo, Jorge et al., Physical Unclonable Functions and Public-Key Crypto for FPGA IP Protection, Philips Research Laboratories, Eindhoven, The Netherlands (available prior to Mar. 7, 2013).

Colopy, Robyn et al., SRAM Characteristics as Physical Unclonable Functions, Worcester Polytechnic Institute, Mar. 6, 2009.

* cited by examiner $$\{h_e, H(p_e, h_e)\} \leftarrow \text{init}[\,]$$

$p_e \leftarrow \text{f\_read\_PUF}[\,]$
$rand \xleftarrow{R} \{0,1\}^\ell$
$\{h_e, H(p_e, h_e)\} \leftarrow \text{f\_init\_PUF}[p_e, rand]$
Clear $p_e, rand$
return $\{h_e, H(p_e, h_e)\}$

FIG. 4

$$\text{create}[S_o, h_e, H(p_e, h_e), \sigma_{h_e}, K^+_{TTP}]$$

if $\text{Verify}_{K^+_{TTP}}(\{h_e, H(p_e, h_e)\}, \sigma_{h_e}) = \text{accept}$ then
    $S_{po\_bind} \leftarrow \text{f\_create\_sym\_keys}[S_o, h_e, H(p_e, h_e)]$
    $\text{f\_create\_asym\_keys}[S_{po\_bind}]$
    Clear $S_{po\_bind}$
else
    ABORT

FIG. 5 launch$[\mathbf{C}, C.inputs, S_o, h_e, H(p_e, h_e),\quad]$

Configure CPU into CAR Mode
Load $\mathbf{C}$ into the CPU cache
$S_{po\_bind} \leftarrow$ f_create_sym_keys$[S_o, h_e, H(p_e, h_e)]$
$K^+_{po\_bind} \leftarrow$ f_read_asym_keys$[\quad]$
$CR.PCR \leftarrow H(\mathbf{C})$
$CR.K_C \leftarrow KDF_{CR.K_{po\_code}}(H(\mathbf{C}))$
if $(S_{po\_bind} = \perp)$ then
   Clear $CR.*$
   ABORT
Clear $S_{po\_bind}$
Transfer control to $\mathbf{C}$'s entry point

FIG. 6

$$X \leftarrow \text{unbind}[\{X_1, PCR\_ver\}_{K^+_{po\_bind}}, \{X_2, PCR\_ver\}_{K_C}]$$

if $\{X_1, PCR\_ver\}_{K^+_{po\_bind}} \neq NULL$ then
   $X, PCR\_ver \leftarrow \text{Dec}_{CR.K^{-1}_{po\_bind}}(\{X_1, PCR\_ver\}_{K^+_{po\_bind}})$
else if $\{X_2, PCR\_ver\}_{K_C} \neq NULL$ then
   $X, PCR\_ver \leftarrow \text{AuthDec}_{CR.K_C}(\{X_2, PCR\_ver\}_{K_C})$
else
   $X \leftarrow \perp$
   return $X$
if $CR.PCR \neq PCR\_ver$ then
   $X \leftarrow \perp$
return $X$

FIG. 7

$$out \leftarrow \text{bind}[K_{VP}, stateOS, hashInputs, resultV, update]$$

if $update \neq NULL$ then
   $C' \leftarrow \text{AuthDec}_{K_{VP}}(update)$
   if $C' \neq \perp$ then
     $CR.PCR \leftarrow H(C')$
     $CR.K_C \leftarrow KDF_{CR.K_{po\_code}}(CR.PCR)$
$out.OS \leftarrow \text{AuthEnc}_{CR.K_C}(stateOS, CR.PCR)$
$V.hosstate \leftarrow H(stateOS)$
$V.hinp \leftarrow hashInputs$
$V.encK \leftarrow \text{AuthEnc}_{CR.K_C}(K_{VP}, CR.PCR)$
$V.res \leftarrow resultV$
$out.V \leftarrow \text{AuthEnc}_{K_{VP}}(V)$
Clear $CR.*$
Clear all state
return $out$

FIG. 8

$S_{po\_bind} \leftarrow$ f_create_sym_keys$[S_o, h_e, H(p_e, h_e)]$ $p'_e \leftarrow$ f_read_PUF[]
$K_p \leftarrow$ f_fuzzy_extract_PUF$[p'_e, h_e, H(p_e, h_e)]$
Clear $p'_e$
$CR.K_{po} \leftarrow KDF_{K_p}(S_o)$
$S_{po\_bind} \leftarrow KDF_{CR.K_{po}}(\text{``bind''})$
$CR.K_{po\_auth} \leftarrow KDF_{CR.K_{po}}(\text{``auth''})$
$CR.K_{po\_encr} \leftarrow KDF_{CR.K_{po}}(\text{``encr''})$
$CR.K_{po\_code} \leftarrow KDF_{CR.K_{po}}(\text{``code''})$
if $K_p = \perp$ then
   Clear $CR.*$
   $S_{po\_bind} \leftarrow \perp$
Clear $K_p$
return $S_{po\_bind}$

FIG. 9

```
Setup Session
1. V           : V.inp.cmd ← "setup"
               : K_TP ←^R {0,1}^ℓ
               : V.inp.pubdata ← pubInputs
               : V.inp.privdata ← AuthEnc_{K_TP}(privInputs)
               : V.inp.encsym ← Enc_{K_{pub,bind}}({K_TP, H(foo())})
   V → OS      : (foo(), V.inp)

Launch Code
2. OS          : OS.inp ← NULL
               : launch{foo(), {V.inp, OS.inp}}

Execute Code foo()
3. IEE         : if (V.inp.cmd == "setup") then
               :   ksym ← unbind{V.inp.encsym, NULL}
               :   if (ksym == ⊥) then ABORT
               :   data_1 ← V.inp.pubdata
               :   if (V.inp.privdata ≠ NULL) then
               :     data_2 ← AuthDec_{ksym}(V.inp.privdata)
               :     if (data_2 == ⊥) then ABORT
               :   else
               :     data_2 ← NULL
               :   state ← doWork1(data_1, data_2)
               :   out ← bind{ksym, state, H(V.inp), NULL}
               : else if (V.inp.cmd == "compute") then
               :
               :   ...
               : else
               :   /*Some other functionality*/
               :   ...

Save State
4. IEE → OS    : (out.OS, out.V)
   OS          : store (foo(), out.OS)

Verify Execution
5. OS → V      : (out.V)
   V           : outV ← AuthDec_{K_TP}(out.V)
               : if (outV == ⊥) then
               :   reject: invalid computation
               : if (outV.hinp ≠ H(V.inp)) then
               :   reject: invalid inputs
```

FIG. 10

```
Setup Session
1.  V             : V.inp.cmd ← "compute"
                  : V.inp.pubdata ← pubInputs
                  : V.inp.privdata ←
                  :       AuthEnc_{K_vp}(privInputs, outV.hosstate)
                  : V.inp.encsym ← outV.encK
    V → OS        : (foo(), V.inp)

Launch Code
2.  OS            : OS.inp ← out.OS
                  : launch[foo(), {V.inp, OS.inp}]

Execute Code foo()
3.  IEE           : if (V.inp.cmd = "setup") then
                  :   ...
                  : else if (V.inp.cmd = "compute") then
                  :   ksym ← unbind[NULL, V.inp.encsym]
                  :   if (ksym = ⊥) then ABORT
                  :   data_1 ← V.inp.pubdata
                  :   if (V.inp.privdata ≠ NULL) then
                  :     data_2 ← AuthDec_{ksym}(V.inp.privdata)
                  :     if (data_2 = ⊥) then ABORT
                  :   state_{old} ← unbind[NULL, OS.inp]
                  :   if (data_2.Vhosstate ≠ H(state_{old})) then ABORT
                  :   {state_{new}, res} ← doWork2(state_{old},
                  :                                 data_1, data_2)
                  :   out ← bind[ksym, state_{new}, H(V.inp), res]
                  : else
                  :   /*Some other functionality*/
                  :   ...

Save State
4.  IEE → OS      : (out.OS, out.V)
    OS            : store (foo(), out.OS)

Verify Execution
5.  OS → V        : (out.V)
    V             : outV ← AuthDec_{K_vp}(out.V)
                  : if (outV = ⊥) then
                  :   reject: invalid computation
                  : if (outV.hinp ≠ H(V.inp)) then
                  :   reject: invalid inputs
```

FIG. 11

SYSTEMS AND METHODS FOR MAINTAINING INTEGRITY AND SECRECY IN UNTRUSTED COMPUTING PLATFORMS

CLAIM OF PRIORITY

This application claims priority to U.S. Provisional Application No. 61/774,641, which is entitled "OASIS: On Achieving a Sanctuary for Integrity and Secrecy on Untrusted Platforms," and was filed on Mar. 8, 2013, the entire contents of which are hereby incorporated by reference herein.

TECHNICAL FIELD

This patent relates generally to the field of information security, and, more particularly, to systems and methods for trusted execution of software programs, data encryption, and data integrity verification in computing systems.

BACKGROUND

In recent years many widely deployed computing systems and, in particular, computing systems that are linked via data networks such as the Internet, have been subjected to security exploits that enable the execution of malicious software programs, exfiltration of private data from users, and corruption of user data. One challenge confronting the secure operation of computing devices is that the trusted computing base (TCB) for the execution of software programs tends to be quite large. The TCB refers to all of the software and hardware components that a user must rely upon or "trust" to ensure secure operation of a computing device. In a traditional computing device, the TCB includes all of the hardware and software that is present in a PC, mobile electronic device, or other computing system owned by a user. Furthermore, in networked computing applications the TCB often extends to computing systems that are beyond the control of the user.

Some existing security solutions seek to reduce the size of the TCB using complex processing devices that implement executable code signing and verification and optionally implement encryption for secure data storage. For example, the Trusted Platform Module (TPM) standard describes a class of secure co-processor devices that are incorporated in some existing computing systems. A TPM is typically incorporated as a separate microprocessor that performs a limited set of security operations to provide some assurance that the computing system is executing approved software applications that have not been subjected to tampering by verifying message authentication codes (MACs) and digital signatures for the MACs using one or more predetermined digital certificates that are issued by trusted digital certificate authorities.

While TPM modules and other similar security hardware solutions can improve the security of computing platforms under some operating conditions, the existing solutions also suffer from drawbacks in operational complexity, reliability, and security. First, TPM chips are expressly designed to be physically separate from the main processor such as a central processing unit (CPU) or other processor, such as a System on a Chip (SoC). The TPM module is separated from the main processor to protect secret data from software that is executed on the main processor, but means that the TPM must be manufactured and installed separately from the main processor. Second, TPM chips typically have a non-volatile memory that stores secret keys for the computing device in a more secure manner than using traditional data storage devices such as hard drives or other storage media. The non-volatile memory is typically formed from NAND or NOR flash technology or other electronically erasable programmable read-only memory (EEPROM) modules. As is known in the art, these non-volatile memory devices often have a rather limited number of write cycles before the memory devices begin to fail. Thus, many TPMs cannot effectively store dynamic data that changes often during operation of the computing device. Finally, the non-volatile memory in the TPMs makes the TPMs susceptible to offline attacks since non-volatile memory retains data when the TPMs are deactivated and even when the TPMs are removed from the computing device and disassembled. Long-term storage of secret data also increases the difficulty in transferring a computing device between owners since the first owner often does not want the second owner to have any access to secret data stored in the TPM. Given these limitations, improvements to computing systems that reduce the TCB without requiring long-term storage of secret data in non-volatile memory would be beneficial.

SUMMARY

In one embodiment, a method for operating a computing system using a trusted processor has been developed. The method includes generating with a trusted processor a first secret cryptographic key based on a physically unclonable function in at least one hardware component in the trusted processor, the first secret cryptographic key being unavailable to other components in the computing system, generating with the trusted processor a first asymmetric cryptographic key pair with reference to the first secret cryptographic key and a predetermined asymmetric cryptographic key generation process, the first asymmetric cryptographic key pair including a first public key and a first private key, executing with the trusted processor instruction code corresponding to a first software program to generate output data, generating with the trusted processor first encrypted data corresponding to the output data, generating with the trusted processor authentication data for the first encrypted data, and transmitting with an input/output (I/O) interface operatively connected to the trusted processor the first encrypted data and the authentication data for storage in an untrusted memory.

In another embodiment, a computing system with a trusted processor has been developed. The system includes an untrusted memory configured to store data, an input output (I/O) interface configured to send and receive data from the untrusted memory, and a trusted processor operatively connected to the untrusted memory and the I/O interface. The trusted processor is configured to generate a first secret cryptographic key based on a physically unclonable function in at least one hardware component in the trusted processor, the first secret cryptographic key being unavailable to other components in the computing system, generate a first asymmetric cryptographic key pair with reference to the first secret cryptographic key and a predetermined asymmetric cryptographic key generation process, the first asymmetric cryptographic key pair including a first public key and a first private key, execute instruction code corresponding to a first software program to generate output data, generate first encrypted data corresponding to the output data, generate authentication data for the first encrypted data, and transmit with the input/output (I/O) interface the first encrypted data and the authentication data for storage in the untrusted memory.

BRIEF DESCRIPTION OF THE DRAWINGS

FIG. 4 is a code listing for an init function that is associated with the process of FIG. 3.

FIG. 5 is a code listing for a create function that is associated with the process of FIG. 3.

FIG. 6 is a code listing for a launch function that is associated with the process of FIG. 3.

FIG. 7 is a code listing for an unbind function that is associated with the process of FIG. 3.

FIG. 8 is a code listing for a bind function that is associated with the process of FIG. 3.

FIG. 9 is a code listing for a symmetric key generation process.

FIG. 10 is a code listing for an illustrative application of a trusted processor in a searchable encryption database system.

FIG. 11 is another code listing for the illustrative application of the trusted processor in the searchable encryption database system.

DETAILED DESCRIPTION

Figure 1:
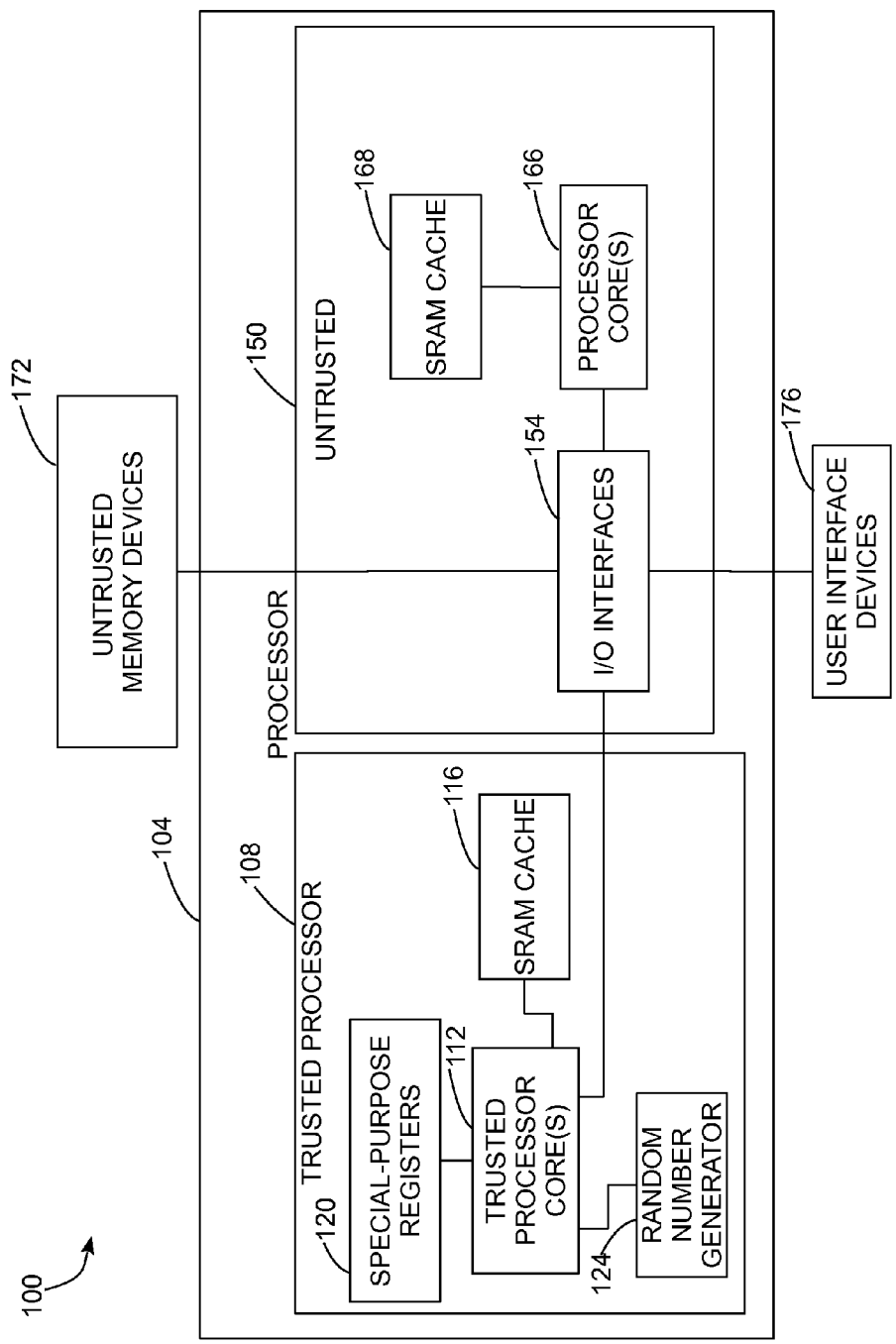
FIG. 1 is a schematic diagram of a computing system that includes a system on a chip (SoC) with a trusted processor and an untrusted processor.

For the purposes of promoting an understanding of the principles of the embodiments described herein, reference is now be made to the drawings and descriptions in the following written specification. No limitation to the scope of the subject matter is intended by the references. This patent also includes any alterations and modifications to the illustrated embodiments and includes further applications of the principles of the described embodiments as would normally occur to one skilled in the art to which this document pertains.

As used herein, the term "trusted processor" refers to a computing device in a computing system that is relied upon for performing at least one of a data encryption, decryption, authentication, and integrity verification process. A trusted processor forms all or a portion of a trusted computing base for a particular computing system. The embodiments of the trusted processor described herein are either combined with other computing processors that include untrusted components or are embodied as discrete processors that are operatively connected to untrusted components. As used herein, the term "trusted computing base" (TCB) refers to the hardware and software in a computing system that a user needs to trust in order to have assurances that the computing system is operating as intended and not modified from an original expected configuration. Properties of secure operation includes, but are limited to, assurances that data remain private through encryption and assurances that data, including executable program code and other content data, have not been tampered with through integrity verification. As is known in the art, reductions to the size and complexity of the trusted computing base simplify the process for auditing and verification of the security in a computing system and reduce the avenues to attack the computing system.

As used herein, the term "component" refers to any hardware or software element in a computing system that processes, stores, or transmits data. The hardware and software components in a computing system that are outside of the trusted computing base are referred to as "untrusted" components such as untrusted processors, data storage devices, and remote computing devices that are accessed through data networks. During operation, a user does not have to fully rely upon the untrusted components to perform as intended because the validity of any operation that the untrusted components perform is verified by the TCB. Consequently, if the user trusts the operation of the TCB, then the user can verify the operations of the untrusted components in the computing system and identify if the untrusted components have been compromised by an attacker or are otherwise not operating as intended.

As used herein, the term "volatile memory" refers to random access memory (RAM) devices that do not retain stored data in the absence of electrical power. By contrast, non-volatile data storage devices such as flash memory or magnetic storage media retain information in the absence of electrical power and typically retain the data if a computing device is disassembled. While long-term data storage is a useful feature for some purposes, when cryptographic keys are stored in a non-volatile memory, then the long-term nature of non-volatile memory storage presents an attacker with a wide range of possible avenues for attacking the storage device to retrieve the key data compared to attempting to retrieve the key data from a volatile memory that typically cannot retain the data in the absence of electric power for more than a few seconds.

In one embodiment, the volatile memory is embodied as a static RAM (SRAM), which is often incorporated in the silicon dies of processors to act as a high-speed cache memory. In another embodiment, dynamic RAM (DRAM) can also be incorporated as a cache on-die with the processor, be incorporated as a separate memory chip that is connected to the processor through a package substrate, or be connected to the processor through an external memory interface such as a bus or point-to-point memory interface. In addition to rapid loss of stored data in the absence of electrical power, volatile memory devices typically enable a very large number of read and write operations. Thus, a volatile memory device that is integrated with the processor typically remains operational for the entire operational lifetime of the computing device. By contrast, most existing non-volatile memory devices that are tightly integrated with processors, such as NAND and NOR flash devices, have a comparatively small number of read and write cycles, typically less than one million cycles.

As used herein the term "message authentication code" MAC refers to a numeric code that is generated from a set of data using a cryptographically secure hash algorithm such as a hash function in the SHA-2 and SHA-3 families, a symmetric key algorithm such as the CMAC algorithm that uses a predetermined encryption cipher (e.g. the AES standard), or another suitable hashing function. As is known in the art, a MAC enables the generation of a unique numeric value that is represented in a comparatively small number of bits (e.g. 256, 384, or 512 bits) for larger sets of data. Any change to the original data set results in the generation of another MAC code that does not match the original MAC, which enables identification of alterations to a set of data. A MAC typically is generated using a secret known to a single signing-authenticating party or shared between a signing party and a different authenticating party, such as a symmetric cryptographic key.

In an alternative to a MAC, a public-private key pair can be used to generate signatures for data and verify that the signatures correspond to the data. In a public-private key embodiment, the private key generates the signature for the data to enable another party to verify the authenticity of the data from the signature using a public key that corresponds to the private key. Only the signing party has access to the private key, but the public key is not kept secret to enable verification of the signatures that are generated using the private key. In the embodiments described below, the private key is a secret that is known only to the trusted processor. Both the MAC and the private key signature are referred to more generally as "authentication data" that enable a computing device that receives a message from an outside source through untrusted channels to verify the authenticity of the message from a particular sender.

As used herein, the terms "verifier computing device" or "verifier" are used interchangeably and refer to a computing device that is external to the trusted processor. The verifier sends and receives encrypted data to communicate with the trusted processor. In one embodiment described below, the verifier receives data from the trusted processor to ensure that the trusted processor is operating as intended. The trusted processor can operate without a verifier, but the verifier can be used to ensure proper operation and execution of software code within the trusted processor.

As used herein, the terms "program" and "software program" are used interchangeably and refer to digital data that are encoded in a predetermined format that can be recognized and executed by a processor. As described below, some software programs are executed by trusted processors. A program includes "instruction code" that includes individual instructions that a processor executes in different sequences to run the program. As used herein the term "program state data" refers to any data that characterize the state of a program during execution of the program. For example, the binary executable code of a program forms a portion of the program state, but the program state data further include the values of registers, memory stack and allocated memory heap data, the value of the program counter, thread local data in multi-threaded programs, file handles, socket handles, memory mapped resource data, and the like. As used herein, the term "input data" refer to any data that a program receives during execution. During program execution, a program often receives input data from files stored in volatile or non-volatile memory devices or from user input devices, performs processing, and generates output data. As used herein, the term "output data" refers to data that are generated for output during the execution of the program. The output data include, but are not limited to, data written to files, sockets, memory mapped regions, and the like. During program execution using the trusted processor, at least some output data are stored in untrusted RAM or non-volatile disk devices and are later retrieved during execution of a program. As described below, the trusted processor ensures that output data are encrypted and cryptographically signed to preserve the privacy and integrity of the output data. The trusted processor also verifies that a program requesting access to previously generated output data as subsequent input data is authorized to access the output data.

While microprocessors that include volatile memory devices are mass-produced using known processes, the manufacturing processes produce some random properties in the operation of the volatile memory devices. These variations cannot be reproduced in any practical manner and are referred to as a "physically unclonable function" (PUF) of the volatile memory device. In the processor embodiments described below, the PUF of a built-in volatile memory cache serves as the basis for generation of cryptographic keys that are unique to each processor. Each instance of the processor generates an encryption key based on the PUF and uses the cryptographic key while powered on. The cryptographic key is deleted either expressly or whenever the processor is deactivated. However, the processor is configured to regenerate the same cryptographic key based on the PUF when reactivated. A single cryptographic key that is generated based on parameters of the PUF for the processor is used as a basis for generating multiple cryptographic keys that are associated with different software programs that use the processor. The processor uses a fuzzy extractor that is known to the art to regenerate the same secret key using the characteristics of the PUF and using cryptographically signed helper data that enable the trusted processor to regenerate the secret key even when the characteristic of the PUF vary slightly over time. The processor uses the single key to generate additional secret symmetric cryptographic keys and asymmetric cryptographic key pairs including public and private cryptographic keys for use with both symmetric and public-key cryptographic systems.

Because of PUF variability across different environmental conditions (voltage, temperature, humidity, etc.), when a PUF is challenged with $Challenge_i$ the received response is $R'_i$, which is a noisy version of an originally recorded response $R_i$. In cryptographic applications, where the PUF response is used as a source of secret-key material the noisy response $R'_i$ is unacceptable. To solve the problem of noisy response data, algorithms that are known to the art as fuzzy extractors leverage non-secret helper data to work around the noisy nature of physical measurements and typical of PUF applications. For example, error correction codes or via a combination of error correction codes and hardware built-in mechanisms can be used to correct errors in noisy responses $R'_i$. Fuzzy extractors have two main functions: (i) correcting errors and (ii) generating a uniformly random string usable as a cryptographic key. In one embodiment, the fuzzy extractor is implemented in a silicon block in a trusted processor and is accessible as a function that is used (in combination with the PUF interface) to implement functionality in the processor. In other embodiments, the fuzzy extractor is implemented using a combination of hardware and software or using an area of the processor that stores software instructions but cannot be easily modified to ensure that the software instructions for the fuzzy extractor are not altered.

In one embodiment, two functions enable the trusted processor to interact with a robust fuzzy extractor that is known to the art. First, the function f_init_PUF[$p_e$, rand], accepts a raw PUF response $p_e$ and a random value rand and outputs helper data $h_e$ and a cryptographically secure hash $H(p_e, h_e)$. The helper data he can be used to reconstruct a uniformly random value $K_p$ from a noisy raw PUF response $p'_e$. The trusted processor uses the hash $H(p_e, h_e)$ to guarantee that only values $K_p$ constructed with the original helper data he are used during the further processing in trusted processor. This function is usually associated with an enrollment or registration procedure. Second, the function f_fuzzy_extract PUF[$p'_e$, $h_e$, $H(p_e, h_e)$] accepts a (noisy) raw PUF response $p'_e$ and helper data $h_e$ and outputs a uniformly random value $K_p$, which can be used as a cryptographic key by a cryptographic primitive or protocol. Observe that the function f_fuzzy_extract_PUF[ ] checks for correctness in the value of H(pe,he) and outputs a special symbol ⊥ if the input does not correspond to the computed value. If the output is ⊥, the instruction calling f_fuzzy_extract_PUF[ ] takes a predetermined error-handling action, which is implementation and application dependent.

FIG. 1 depicts a computing system 100 that includes a system-on-a-chip (SoC) 104 that includes both a trusted processor unit 108 and an untrusted processing unit 150 formed from a single silicon die. The trusted processor unit 108 includes one or more trusted processor execution cores 112, a volatile static random access memory (SRAM) cache 116, special-purpose volatile memory registers 120, and a hardware random number generator 124. The untrusted processor unit 150 includes one or more untrusted processing cores 166, another SRAM cache 168, and one or more input/output (I/O) interface devices 154.

In the embodiment of the processor 104, the trusted processor cores 112 implement a general-purpose instruction set architecture (ISA) such as an ISA from the x86, ARM, POWER, or MIPs families of instruction sets. The trusted processor cores 112 is further configured to decode and execute additional instructions that enable the trusted processor cores 112 to generate secret key data using a PUF based on the physical characteristics of at least one component in the trusted processing unit 108, to access the hardware random number generator 124, and load and store data in the special-purpose registers 120 and SRAM cache 116. In the example of FIG. 1, the manufacturing variances in the SRAM cache 116 that are different between individual instances of the processor 104 provide PUF that the trusted processor unit 108 uses as a basis for the generation of cryptographic keys without requiring that the cryptographic keys be stored in a non-volatile memory. While the embodiment of FIG. 1 depicts the trusted processing unit 108 with an SRAM cache, other embodiments include a DRAM cache or other volatile memory cache for temporary storage of data within the trusted processing unit 108.

The special-purpose registers 120 are volatile memory registers that are specially configured to store key data for both secret keys and public-private key pairs, hash data associated with message authentication codes (MACs) for software code that is executed by the trusted processor cores 112. The special-purpose registers 120 are separate from general-purpose registers that are incorporated in the trusted processor cores 112. In one embodiment, the special-purpose registers 120 are also physically separate from the SRAM cache 116, while in another embodiment the special purpose registers 120 are implemented using a portion of the SRAM cache 116. The SRAM cache 116 is an example of a volatile memory that is operatively connected to the trusted processor cores 112. As described below, the trusted processor cores 112 operate in a "cache-as-RAM" (CAR) operating mode where the SRAM cache 116 is treated as a general-purpose memory device that stores binary program data for execution by the processor cores 112 and stores input/output and program state data. The trusted processor cores 112 only send and receive data with the untrusted processor unit 150 and external untrusted devices through a predetermined set of operations that compute MACs and encrypt data to preserve integrity and privacy.

The interfaces further ensure that executable program code from a first program can only access data that are "bound" to the first program to prevent two different software programs that are executed with the trusted processor unit 108 from accessing each other's data in an unauthorized manner.

The trusted processor 108 includes a hardware random number generator 124. The hardware random number generator (RNG) 124 uses the PUF as a source of entropy for the generation of random numbers. The RNG 124 is a "true" random number generator in that the output data from the RNG 124 are not generated in a repeatable manner. Thus, the RNG 124 is different from a pseudo-random number generator (PRNG). A PRNG produces random data output but if the PRNG is initialized to a predetermined state, then PRNG produces the same random data output in a repeatable manner. While the RNG 124 is depicted as a hardware unit in the illustrative embodiment of FIG. 1, another configuration implements the RNG 124 in software executed by the trusted processor cores 112 using the PUF as an entropy source.

The untrusted processor unit 150 includes one or more untrusted processor cores 166 and another SRAM cache 168. The untrusted processor cores 166 perform general-purpose computations. In some embodiments, the untrusted processor cores 166 are similar to the trusted cores 112 but the untrusted cores do not implement the additional instructions that are required to operate in the trusted mode. The untrusted processor cores 166 are optionally configured to verify the operation of the trusted processing unit 108. In the embodiment of FIG. 1, the trusted processing unit 108 and untrusted processing unit 150 include separate SRAM caches 116 and 168, respectively. In another embodiment, both the trusted processor unit 108 and the untrusted processor unit 150 share a single SRAM cache. The single SRAM cache is temporarily locked to either the trusted processor unit 108 or the untrusted processor unit 150 to prevent the untrusted processor unit 150 from gaining access to unencrypted data in the SRAM cache during operation of the trusted processor unit 108.

The I/O interface 154 includes one or more devices such as memory controllers for interfacing with external RAM, non-volatile storage device controllers such as SATA disk controllers and the like, peripheral component interconnect (PCI or PCI-express), universal serial bus (USB), $I^2C$, CAN bus, or any other suitable I/O interface. The I/O interface 154 also includes wired and wireless network adapters that provide network communication between the computing system 100 and other computing systems over local area networks (LANs) and wide area networks (WANs).

In the system 100, the trusted processor unit 108 and the untrusted processor unit 150 in the processor 104 are both operatively connected to external untrusted memory devices 172. The memory devices include, for example, RAM and non-volatile data storage devices that are external to the processor 104 and are accessed via the I/O interfaces 154. As described below, the trusted processor unit 108 encrypts and digitally signs data that are stored in the untrusted memory devices 172, and the trusted processor unit 108 verifies the digital signatures of data that are received from the memory 172 to ensure that the data have not been altered while stored in the untrusted memory 172. Thus, the trusted processor unit 108 can transmit output data through the I/O interfaces 154 to the untrusted memory 172 or other computing systems and receive data from untrusted sources through the I/O interfaces 154 while continuing to operate in a secure manner.

The user interface devices 176 include user input devices, such as keyboards, mice, touch input devices, gesture input devices, audio input devices, and the like, that receive data input from a user. The user interface devices 176 also include output devices such as visual display devices, audio output devices, haptic output devices, and the like that generate outputs for the user. Both the trusted processor unit 108 and the untrusted processor unit 150 receive input and transmit output data with the user interface devices 176 via the I/O interfaces 154.

Figure 2:
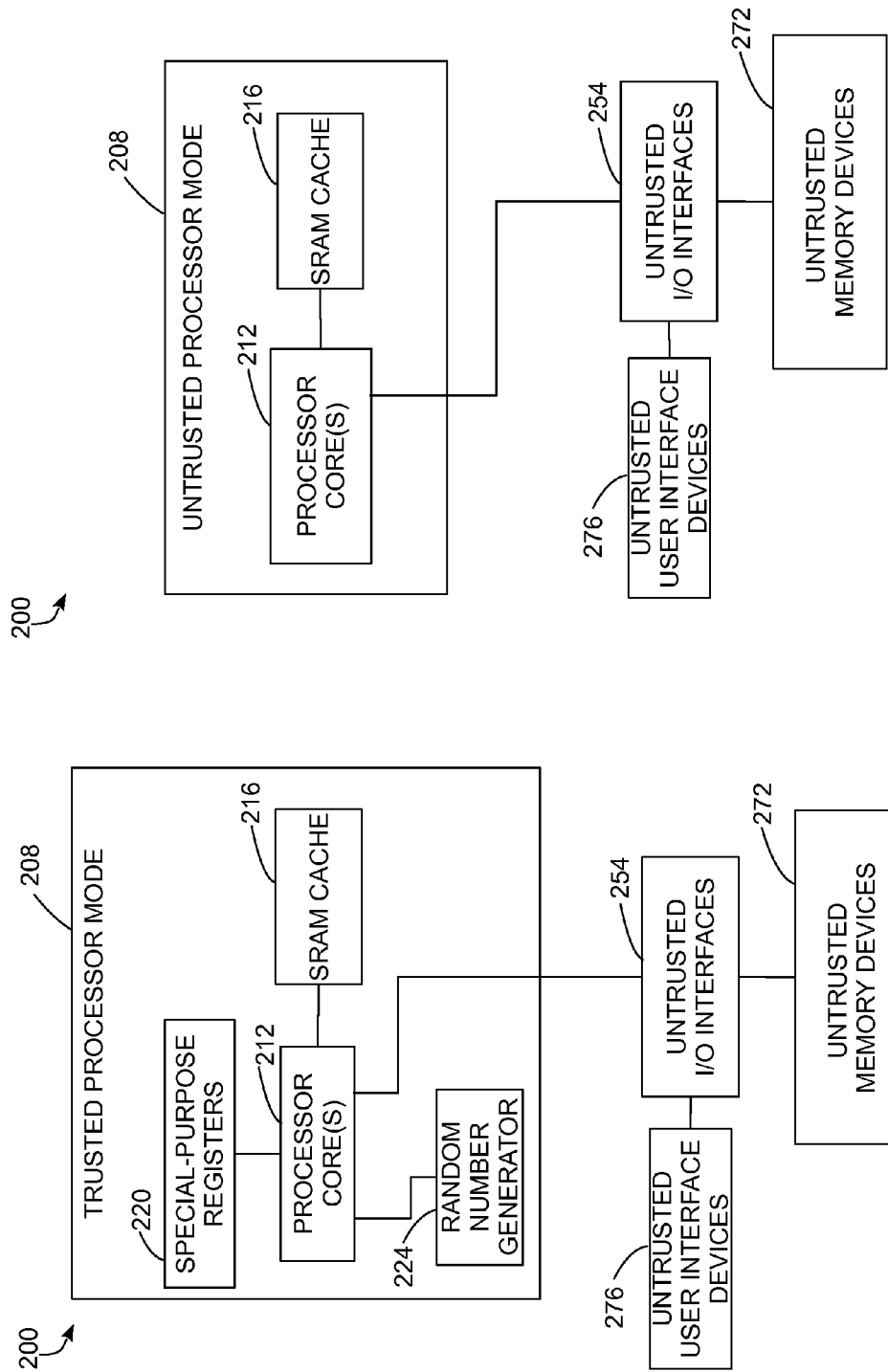
FIG. 2A is a schematic diagram of a computing system that includes a processor configured to act as a trusted processor in a first configuration.
FIG. 2B is a schematic diagram of the computing system of FIG. 2A where the processor is configured to act as an untrusted processor in a second configuration.

FIG. 2A and FIG. 2B depict another configuration of a computing system 200 that uses a single processor in a trusted and untrusted operating mode. In FIG. 2A, a processor 208 includes the processing cores 212, SRAM cache 216, special-purpose registers 220, and random number generator 224. These components operate in the same manner as described above in regards to the trusted processor unit 108 in FIG. 1. In the trusted processor mode 208, the trusted processor cores 212 generate cryptographic keys based on a PUF in the SRAM cache 216 in the same manner as the trusted processor unit 108 in FIG. 1.

FIG. 2B depicts the computing system 200 in which the processor 208 operates in an untrusted operating mode. In the untrusted operating mode, the processor cores 212 execute software programs in a similar manner to prior art processors. In the untrusted operating mode, the processor cores 212 do not execute the additional instructions and functions that are provided in the trusted operating mode, and the processor cores 212 do not access the special purpose registers 220. In the transition from the trusted operating mode to the untrusted operating mode, the processor cores 212 delete the contents of the SRAM cache 216 to ensure that no sensitive data are available to programs that are executed during the untrusted operating mode. In one embodiment of the untrusted operating mode, the processor cores 208 do not have the ability to access the special-purpose registers 220, and the special purpose registers 220 retain cryptographic key data and program state data while the processor 208 remains activated. In another embodiment, the contents of the special-purpose registers 220 are deleted as the processor transitions from the trusted operating mode to the untrusted operating mode. Similarly, the processor 208 clears the SRAM 216 and ceases execution of untrusted program code in a transition to the trusted operating mode.

Figure 3:
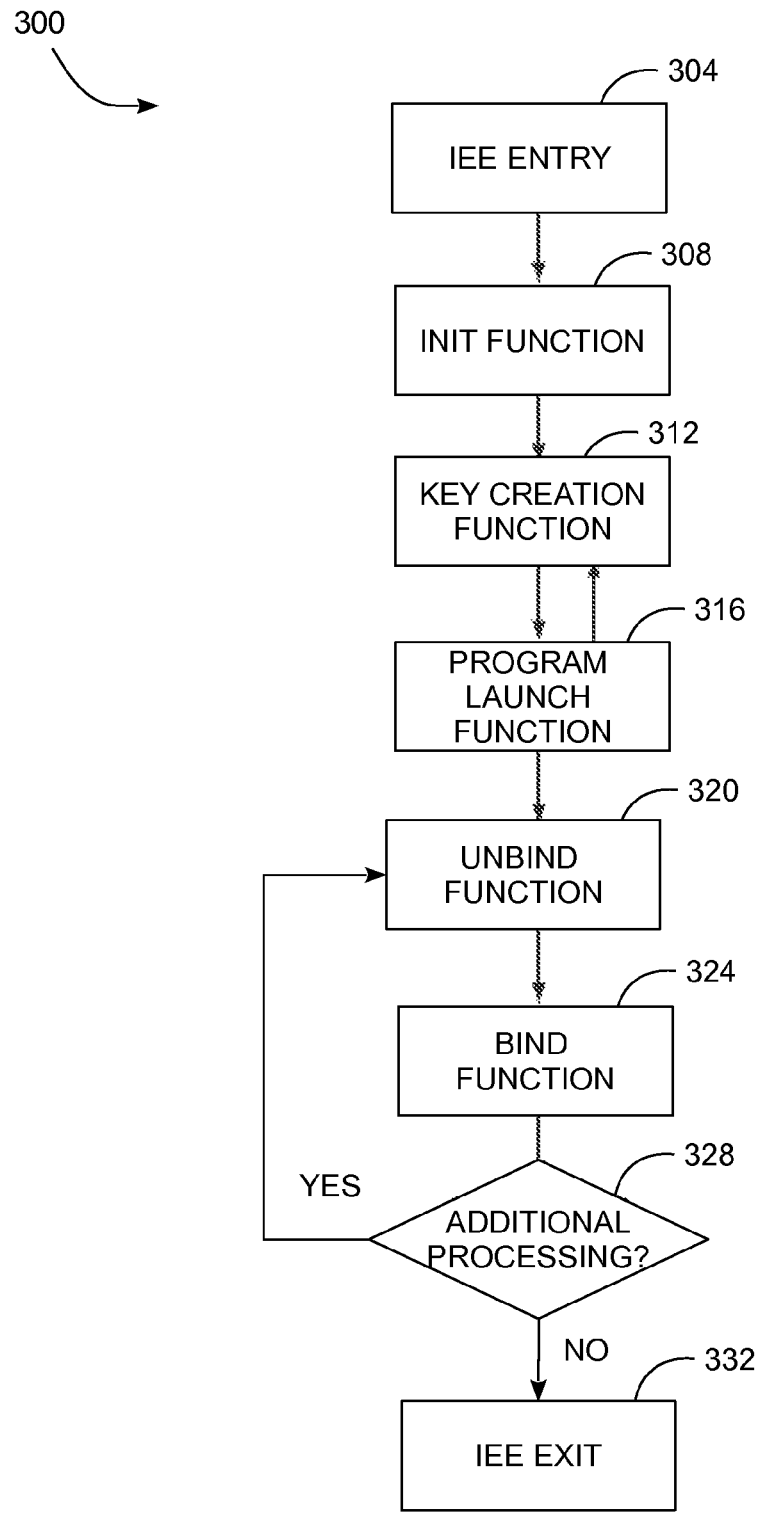
FIG. 3 is a block diagram of a process for operating a trusted processor using a physically unclonable function that is inherent in the processor hardware as a basis for generating cryptographic keys.

FIG. 3 depicts a block diagram of a process 300 for operating a trusted processor to control the execution of instructions for software programs and to control access to data during the execution of the software programs. In the description below, a reference to the process 300 performing a function or action refers to the operation of a processor that executes programmed instructions to perform the function or action in conjunction with one or more components in a computing system. Process 300 is described in association with the computing system embodiments 100 and 200 of FIG. 1 and FIGS. 2A-2B, respectively. Process 300 makes reference to various operations that are performed by a trusted processor or external computing devices including verifiers. The operations are set forth below in Table 1:

TABLE 1

| | Notation |
|---|---|
| $y \leftarrow x$ | Assignment of the value x to variable y. |
| $\perp$ | Denotes a failed operation performed by the trusted processor. |
| $x \| y$ | Concatenation of x and y. |
| x.param | Denotes a parameter param for a variable x. |
| x.* | Denotes all parameters for a variable x. |
| $A \rightarrow B: \langle m \rangle$ | Party A sends a message m to party B. |
| $r \xleftarrow{R} \{0, 1\}^l$ | Assign a random integer of l bits to r. |
| $K_X$ | Symmetric key for a party X that is external to the trusted processor. |
| $K_X^+, K_X^{-1}$, | Public and private keys, respectively, for the party X. |
| $H(x)$ | A cryptographic hash function H applied to data x. |
| $\{P\}_K \leftarrow Enc_K(P)$ | An encryption operation Enc using key K on unencrypted data P to generate encrypted data (ciphertext) $\{P\}_K$. |
| $P \leftarrow Dec_K(\{P\}_K)$ | Decryption of encrypted data $\{P\}_K$ to generate decrypted data P. The key k corresponds to a symmetric encryption and decryption key in a symmetric cryptographic scheme or to a private key that decrypts data encrypted by a corresponding public key in an asymmetric cryptographic scheme. |
| $KDF_K(x)$ | A key derivation function (KDF) of key K and non-secret parameter x. |
| $MAC_K(x)$ | Generation of a message authentication code of x under key K. The MAC is generated using a shared-secret key K. |
| $Sign_{K_X^{-1}}(m)$ | Cryptographic signature process for a message m using a private key $K_X^{-1}$ for party X. |
| $Verify_{K_X^+}(m, \sigma)$ | Verification of signature σ for message m using the public key $K_X^+$ for party X. |
| $Cert_y(x, K_X^+)$ | Certificate issued by a trusted certificate authority y that binds the identify of party X to the public key $K_X^+$. |

Process 300 describes the generation and use of various secret and public data including cryptographic keys. The description of the process 300 makes reference to various variables corresponding to secret and public data and cryptographic keys that are set forth below in Table 2:

TABLE 2

| Hidden Variables: Values accessible only by trusted processor. | |
| --- | --- |
| $P_e$ | Raw PUF response. |
| $K_p$ | Root key generated from PUF response $p_e$. |
| $S_o$ | Secret seed value set by platform user. |
| $p^*, q^*$ | Prime numbers used for generation of RSA public-private key pairs in some embodiments of the process 300. |
| $CR.K_{po}$ | Master platform secret for a specific owner seed. The CR refers to the special-purpose cache registers 120 and 220 that are incorporated with the trusted processors 108 and 208, respectively. |
| $CR.K_{po\_auth}$ | Platform key for authenticating data from untrusted storage. |
| $CR.K_{po\_encr}$ | Platform key for encrypting data before transfer to untrusted storage. |
| $CR.K_{po\_code}$ | Platform key used to derive code specific keys. |
| $CR.S_{po\_bind}$ | Platform binding secret used to derive asymmetric binding keys. |
| $CR.K^-_{po\_bind}$ | Platform private binding key, derived deterministically from $CR.S_{po\_bind}$. |
| $CR.PCR$ | Platform configuration registers that include data stored in the special purpose registers. |
| $CR.PCR\_ver$ | A platform configuration register that stores a hash value that is generated from a particular set of program instruction code C and used to identify if encrypted data correspond to the software program associated with the program code C. |
| Public Variables: Values that can be accessed by untrusted processors and external computing systems. | |
| $CR.K^+_{po\_bind}$ | Platform public binding key, derived deterministically from $CR.S_{po\_bind}$ |
| $h_e$ | Helper data used for noise reduction during a fuzzy extractor that identifies $p_e$. |

As described below, the process 300 utilizes the physically unclonable function (PUF) in the trusted processor to generate secret keys and perform secure program execution without having to store any secret data in a non-volatile memory either within the trusted processor or external to the trusted processor. In the embodiments described here, the SRAM that is incorporated into the trusted processor serves as the source of the PUF. The SRAM-PUF response, $p_e$, serves as a cryptographic secret that is not consistent between different manufactured copies of the trusted processor and that bootstraps a unique device identity, per-application encryption and authentication keys, and random number generation in the trusted processor. The resulting key material is unique not just per physical device, but per device owner. The trusted processor uses the SRAM-PUF response to generate the root key, $K_p$, which never leaves the processor and is never directly accessible by any party (including any software running on the processor). The root key $K_p$ enables the processor to generate a hierarchy of derived keys as follows. A user of the device derives a key ($K_{po}$) that is specific to the user and the device via a key derivation function (KDF) that uses both the root key $K_p$ and the user-supplied seed value $S_o$ to generate a user-specific key $K_{po}$. The term KDF refers to any predetermined process for the generation of cryptographic keys including both secret keys that are used in symmetric encryption and asymmetric key generation processes that generate public-private key pairs. The trusted processor uses the master processor secret, Kpo, to generate secret keys for bulk encryption, authentication. The trusted processor also uses the secret key Kpo to generate secret data for use in deriving an asymmetric key pair including the public key $K^+_{po\_bind}$ and private key $K^{-1}_{po\_bind}$.

The process 300 begins as the trusted processor is activated in a trusted operating mode that establishes an "isolated execution environment" (IEE) (block 304). In the embodiment of FIG. 1, the trusted operating unit 108 operates in a trusted operating mode after the processor 104 is activated. In the embodiment of FIG. 2A, the processor 208 transitions to the trusted operating mode from the untrusted operating mode of FIG. 2B. In the trusted operating mode, the trusted processor is "isolated" from untrusted components in the computing system. For example, and output of data that should not be publicly available outside of the IEE are encrypted prior to being transmitted through an I/O interface device. Additionally, the trusted processor verifies cryptographic signatures for any data that are retrieved from untrusted memory devices 172 and 272 to ensure that the data have not been altered outside of the IEE.

During process 300, the trusted processor performs an initialization at the time of manufacture for the trusted processor (block 308). The initialization process is typically only performed once or a limited number of times during the operational lifetime of the trusted processor. During the initialization process, the hardware manufacturer or other trusted party initializes the master processor key Kp. In one embodiment, the trusted processor invokes a function referred to as the "init[ ]" function to perform the initialization process. FIG. 4 depicts a pseudo-code representation of the init[ ] function.

The output of the init operation is helper data $h_e$ and a hash $H(p_e,h_e)$, which is published and available to anyone using the device. The random number generator in the processor generates random data that is applied to the helper data $h_e$ to prevent the publicly available helper data $h_e$ from being used to identify characteristics of the PUF that might lead to identifying secret data within the trusted processor. In one embodiment, the random number generator generates the random number as a seed for a universal hash function. The random data from the random number generator are stored outside of the trusted processor and can be used to regenerate the universal hash function to reproduce the helper data. In another embodiment, the trusted processor performs a bitwise exclusive-or (XOR) operation with the random data and the raw PUF response data $r_e$. The resulting output R is made publicly available. To regenerate the root key during operation after the init function, the trusted processor performs another XOR operation between the value R and another PUF response $r_e'$, where $r_e'$ includes noise. The result of the second XOR is a noisy version of the original random value that is then decoded as part of the regeneration of the original PUF response $r_e$.

The hash $H(p_e, h_e)$, is generated using a cryptographically secure hashing algorithm. Since the initialization function is called only once or for a limited number of times during the life of the trusted processor, various side-channel attacks that seek to extract information about the properties of the PUF and corresponding secret keys in the trusted processor are largely ineffective. Additionally, a trusted third party (TTP) uses a private key to generate a public-key signature $sh_e \leftarrow SignK^{-1}$ for the helper data $h_e$, which typically includes a MAC with a hash generated from the helper data and digital signature using the signing key $K^{-1}$ that is associated with the TTP. Prior to supplying the helper data $h_e$ to the trusted processor, an untrusted processor verifies the signature for the helper data $h_e$ with the public key $K^+$ of the trusted third-party provider. This ensures that only the appropriate helper data are provided to the trusted processor. Within the trusted processor, even if incorrect helper data $h_e'$ are provided to the "create[ ]" function during subsequent operation, the trusted processor identifies that the hash of $H(p_e', h_e')$, where $p_e'$ is a potentially incorrect PUF response value, do not match either the correct input value for $H(p_e, h_e)$ or another tampered value for $H(p_e, h_e)$ that is generated by an attacker. Thus, the trusted processor does not need to directly verify the signature from the TTP to ensure the correctness of the helper data $h_e$, and does not have to store a certificate for the TTP in a non-volatile memory.

Process 300 continues during operation with a call to a "create[ ]" function that regenerates the master processor key Kp, and other cryptographic keys in the key hierarchy using the PUF inherent to the SRAM or other component in the trusted processor and the helper data $h_e$ that were previously generated during the init process (block 312). The create function is typically executed once after the trusted processor is powered on to enter a trusted processing mode since the key data generated from the PUF are held in volatile memory. As described above, the trusted processor verifies the authenticity of the helper data $h_e$ using the signature for the helper data $h_e$ and the public key $K^+$ from the trusted third party. If the signature does not match the helper data $h_e$, then the trusted processor aborts the process 300. The trusted processor executes the fuzzy extractor process during the create function to regenerate the secret $p_e$ using the helper data $h_e$ to reduce noise during the fuzzy extraction. In some embodiments, the trusted processor uses a "robust" fuzzy extractor that is known to the art to withstand potential attacks from an attacker who generates incorrect helper data to have the trusted processor regenerate an incorrect value of $p_e$, where the attacker attempts to have the trusted processor generate an incorrect value of $p_e$. In order to verify that the correct value of $p_e$ has been regenerated, the trusted processor regenerates the hash value $H(p_e, h_e)$ and compares the internally generated hash value to the publicly available hashed value $H(p_e, h_e)$. If the two values match, then the trusted processor has successfully regenerated the same secrete secret $p_e$ that was generated during the init[ ] function. The trusted processor regenerates secret keys and public key pairs from the secret $p_e$, and the seed data $S_o$ from the user. FIG. 5 depicts a pseudo-code representation of the create function.

After regenerating the secret $p_e$, the trusted processor regenerates the master key $K_p$, generates a user-specific master key $K_{po}$ based on the seed data $S_o$, and generates an asymmetric key pair that includes the public key $K^+_{po\_bind}$ and private key $K^{-1}_{po\_bind}$. The trusted processor uses the secret key $K_{po}$ to generate a larger set of data for generation of the key pair $K^+_{po\_bind}$ and $K^{-1}_{po\_bind}$ using the predetermined asymmetric key generation process such as an RSA or elliptic-curve key generation process. The trusted processor uses the private key $K^{-1}_{po\_bind}$ to generate digital signatures for the data or a MAC generated for the data that are to be stored in an untrusted memory outside the SRAM cache in the trusted processor. The trusted processor uses the public key $K^+_{po\_bind}$ to encrypt data, including output data, program state data, and the corresponding digital signatures, that are copied from the SRAM cache in the trusted processor and are stored in an untrusted memory.

During operation, the trusted processor executes one or more software programs in a secure manner. In FIG. 3, an invocation of the "launch[ ]" function in the trusted processor commences execution of a program after the trusted processor is configured for operation (block 316). During the launch function, the trusted processor populates additional special purpose registers with information pertaining to execution of a specific program. The instruction execution data for the program is referred to as code C. During execution of the launch instruction, the trusted processor loads the executable program instruction code C into the SRAM cache and begins execution of the program code in the cache-as-RAM mode where the SRAM serves as the only trusted memory for reading and writing unencrypted data. During the launch instruction, the trusted processor generates two additional symmetric keys $CR.K_{po\_auth}$ and $CR.K_{po\_code}$ that are used to authenticate data that are received from the untrusted storage device and to generate specific keys for the program code C, respectively. During the launch process, the trusted processor generates a MAC corresponding to the program code C and stores the MAC in one of the special purpose registers as PCR_ver. In another embodiment, the trusted processor uses the MAC corresponding to the program code C and the platform key $K_{po}$ to generate a secret key $K_C$ that is tied to the contents of the code C and not to program instructions for other pieces of code. In one embodiment, the code C further includes the full program state data of a software program during execution of the software program instead of merely the execution instruction code for the software program. FIG. 6 depicts pseudo-code corresponding to the launch function.

During execution of the instruction code C for the software program, the trusted processor 108 often generates output data are stored in an untrusted memory device. The trusted processor and receives input data from untrusted devices including the user interface input devices 176 and 276 of FIG. 1 and FIG. 2, respectively, or from remote computing devices that communicate with the trusted processor through a data network. While some output data may be transmitted as an unencrypted output, in many instances the output data are transmitted through the I/O interface to an untrusted memory for later retrieval and processing by the trusted processor. In other configurations, the data are transmitted through the I/O interface that is a network device to a remote computing system that is connected to the trusted processor by a data network. The output data often include sensitive information that should not be available outside of the trusted processing unit. Additionally, since the trusted processor can executed multiple software programs, the output data from a first software program should not be made available to a second software program unless such sharing is expressly authorized.

During execution of the instruction code C for the software program, the trusted processor 112 often loads data that are stored in an untrusted memory device or are received from another source outside of the trusted processor. During process 300, the trusted processor receives the data through the I/O interface and performs an "unbind[ ]" function that verifies the integrity of the data, verifies that the currently executing program should be granted access to the data, and decrypts the data for use with the program if the verifications are successful (block 320). During the unbind process, input data X that is received from an untrusted memory contains data elements that should only be released to the code that generated the data. The unbind instruction provides assurance to the verifier that input X will only be released to the code with measurement PCR_ver.

In one configuration of the process 300, the trusted processor performs the unbind function shortly after launching execution of a program to enable the trusted processor to receive a symmetric key $K_{vp}$ from a verifier. The key $K_{vp}$ is typically a symmetric encryption key that is available only to the verifier and to the trusted processor. To receive the encrypted key Kvp, the verifier uses the public binding key $K^+_{po\_bind}$ to encrypt the key $K_{vp}$ and the verifier transmits the encrypted key $K_{vp}$ to the trusted processor. The trusted processor uses the private key $K^{-1}_{po\_bind}$ to decrypt the key $K_{vp}$, and uses the key $K_{vp}$ both to encrypt data for transmission to the verifier, and to decrypt input data that are received from the verifier. As described below, in one embodiment, the verifier receives data from the trusted processor and performs independent verification that the trusted processor is executing the program code C using the program code instruction data, program input data, and program output data.

In addition to performing the unbind function to receive the verifier key $K_{vp}$, the trusted processor performs the unbind function to decrypt and verify the integrity data that are received from the I/O interface devices. These data include data that are stored in an untrusted memory during execution of the program code C and later retrieved from the untrusted memory, and data received from the verifier.

In two embodiments of the process 300, the trusted processor has the option to unbind data encrypted using the public binding key ($\{X1,PCR\ ver\}K^+_{po\_bind}$) or the application secret key ($\{X2,PCR\ ver\}K_C$). Both X1 and X2 represent data that are received from the untrusted memory or another source such as the verifier. As described above, the encrypted data X1 include the MAC that is stored in PCR_ver corresponding to the program code C while the encrypted data X2 do not require the MAC because the key $K_c$ is based on the MAC value. In some instances, the input data X1 and X2 correspond to output data that the trusted processor had previously generated during execution of the program C and stored in the untrusted memory using the bind function. The process 300 includes operations for both securely storing output data in the untrusted memory and for receiving, verifying, and decrypting the output data after the output data are stored in the untrusted memory. As described above, in some embodiments the decryption process uses the symmetric key $K_{vp}$ is received from the verifier to decrypt encrypted data during the unbind function. The use of a symmetric key, such as the key $K_{vp}$ or another symmetric key that encrypts data stored in an untrusted memory, with a block cipher decryption process is typically more computationally efficient than using the private key $K^{-1}_{po\_bind}$ to decrypt the full set of encrypted data. FIG. 7 depicts a pseudo-code representation of the unbind function.

In the process 300, the trusted processor implements an asymmetric encryption scheme that prevents an attacker from using the encrypted data $\{X,PCR\ ver\}K^+_{po\_bind}$, which is intended to be decrypted only by the code with measurement PCR_ver, from generating a related encrypted data $\{X,PCR\ ver'\}K^+_{po\_bind}$, which the device would be willing to decrypt for different code with measurement PCR_ver'. The trusted processor implements a non-malleable asymmetric encryption scheme to prevent these attacks. The formal definition of non-malleable is known as Chosen Ciphertext Attack of type 2 (CCA2). Examples of CCA2 (non-malleable) asymmetric encryption schemes include RSA-OAEP and RSA-OAEP+. An alternative strategy to using a non-malleable public-key encryption scheme is to use the secret encrypted with the asymmetric primitive to derive two keys: an encryption key and a MAC key. The MAC key is used to compute a MAC over the bulk-encrypted data, and the receiver rejects encrypted data with an inconsistent MAC.

In addition to unbinding data that are received from external sources, the trusted processor generates signed and encrypted data for output to the external sources, such as the untrusted memory and a verifier, using the "bind[ ]" function (block 324). In the bind function, the trusted processor encrypts the MAC that corresponds to the program code C and that is stored in the PCR_ver register. In some cases, the contents of the execution code C change from the time that the MAC is generated during the launch function to the time at which the trusted processor performs the bind function. The trusted processor regenerates the MAC for the updated code C' to ensure that the MAC accurately reflects the state of the program code C' when the output data are stored in the untrusted memory. The trusted processor encrypts the MAC along with the output data to preserve privacy when the data are stored in an untrusted memory. The trusted processor signs the encrypted data to enable the trusted processor to identify if the encrypted data are modified outside of the confines of the trusted processor unit. As described below, the trusted processor later retrieves the output data that are stored in the untrusted memory and uses the signature and the MAC corresponding to the program instruction code C to ensure that the retrieved data are valid and that the software program that is being executed by the trusted processor should have access to the output data. In another embodiment, the trusted processor generates a MAC for the unencrypted output data first and then encrypts either both the output data and the MAC or only the output data. The trusted processor then transmits the unencrypted MAC with the encrypted data through the I/O interface to the untrusted memory. FIG. 8 depicts a pseudo-code representation of the bind function.

In one embodiment of the bind function, the trusted processor generates the secret symmetric key $CR.K_{po\_encr}$ and uses the key $CR.K_{po\_encr}$ to encrypt the MAC for the program code C and the output data using a predetermined symmetric key encryption process (e.g. an AES block cipher in a cipher-block-chain (CBC) or counter-mode encryption scheme). The symmetric key $CR.K_{po\_encr}$ is used for bulk encryption instead of the public key $K^+_{po\_bind}$ for performance reasons since using the secret key with known block cipher encryption processes is typically much faster than using the public key $K^+_{po\_bind}$ to encrypt all of the data that are stored in the untrusted memory. Instead, the public key $K^+_{po\_bind}$ only encrypts the comparatively small set of data in the secret key $CR.K_{po\_encr}$ and the encrypted secret key is stored with the rest of the encrypted data in the untrusted memory. During a subsequent unbind operation, the trusted processor uses the same secret key $CR.K_{po\_encr}$ to decrypt the MAC and the output data for use with the trusted processor. In another instance of the bind function that transmits data to the verifier, the trusted processor uses the symmetric key $K_{vp}$ for the verifier instead of $CR.K_{po\_encr}$ to encrypt the bound data for the verifier. During a verification process, the trusted processor also generates a hash value of the input data that the program code C has received and a hash of the program state data. The verifier receives the input and program state hashes as part of an external verification process for the operation of the trusted processor.

During the bind operation, the trusted processor also uses the private key $K^{-1}_{po\_bind}$ to generate a cryptographic signature of the entire set of encrypted data. In one embodiment, the trusted processor generates another hash for the encrypted data and uses the private key $K^{-1}_{po\_bind}$ to generate a signature for the hash of the encrypted data instead of generating a signature for the entire set of encrypted data directly. The trusted processor uses the public key $K^{+}_{po\_bind}$ to verify the signature for the encrypted data or corresponding hash of the encrypted data when the data are retrieved from the untrusted memory to ensure that the data have not been altered outside of the SRAM cache in the trusted processor. In instances where the verifier receives data that the trusted processor generates with the bind function, the verifier also has a copy of the public key $K^{+}_{po\_bind}$ to verify the signature of the data.

In another embodiment, the trusted processor uses the application-specific secret symmetric key $K_C$ that is based on the hashed value of the instruction code C to generate a MAC of the encrypted data using $K_C$ instead of a signature using the private key $K^{-1}_{po\_bind}$. The secret key $K_C$ is not stored in the untrusted memory and remains in the trusted processing unit for later use in verifying the encrypted data when the trusted processor subsequently retrieves the encrypted data from the memory. Since the secret key $K_C$ is based on the hashed value of the instruction code C, the trusted processor does not have to encrypt and store the hashed value with the data when the key $K_C$ is used to verify the signature. Instead, if the trusted processor executes a second software program with a different set of code C', then the trusted processor generates another secret key $K_C'$. The trusted processor then identifies that a verification of the signature on the data fails when using the key $K_C'$ to prevent the code C' from accessing data that were stored during execution of the first software program with code C.

Process 300 continues as the trusted processor continues to execute the program instruction code for the software program (block 328). As described above, in the CAR operating mode, the SRAM cache or other non-volatile memory that is within the trusted processing module stores any data that are unencrypted and directly accessible to the trusted processor. As described above, in some situations the trusted processor writes data to an untrusted memory storage device using the bind function and receives data from the untrusted memory with the unbind function.

At the conclusion of the program execution in the process 300, the trusted processor clears some or all of the private data from the special-purpose registers and the SRAM cache to exit the isolated execution environment (block 332). In the embodiment of FIG. 1, the trusted processor unit 108 is separate from other components in the processor 104, and optionally retains data such as the master keys $K_p$ and $K_{po}$ and the asymmetric cryptographic key pair $K^{+}_{po\_bind}$ and $K^{-1}_{po\_bind}$ for execution of another trusted program. The trusted processor unit 108 deletes data from SRAM cache 116 that could be accessed by another trusted program prior to executing the instruction code for another program. In the embodiment of FIG. 2A and FIG. 2B, the processor 204 deletes all sensitive information from the special-purpose registers and from the SRAM cache 216. The processor 204 then continues in an untrusted operating mode to execute software programs in a similar manner to prior art processors.

FIG. 9 is a pseudo-code representation of a symmetric key generation process that the trusted processor performs to generate secret symmetric keys. This function first loads the helper parameter input $H(p_e,h_e)$ and $h'_e$ into memory. Next, the trusted processor reads the PUF is read and the fuzzy extractor is invoked to generate the platform symmetric secret key, $K_p$, from the de-noised PUF value. Internally the fuzzy extractor checks for consistency of the input data for the PUF. In particular, the fuzzy extractor checks if input $H(p_e,h_e)$ and $h'_e$ correspond with the internally reconstructed value. A special symbol $\perp$ is output should the values not be equal. At the end of the process, the function checks if the fuzzy extractor returned the special symbol $\perp$, which indicates that either the PUF response was too noisy and therefore $K_p$ could not be reconstructed or $H(p_e,h_e) \neq H(p'_e,h'_e)$. In either case, the trusted processor clears all special-purpose registers for security reasons and the function returns the special symbol $\perp$ to indicate failure.

The trusted processor uses the key $K_p$ and the user-supplied seed $S_o$ to derive the master processor secret, $CR.K_{po}$. The seed value $S_o$ enables the device user to personalize the processor keys (e.g., the current owner of the chip can simply choose a new seed value to prevent access by previous owners). The symmetric key $CR.K_{po}$ is used for the derivation of three symmetric platform keys: (i) $CR.S_{po}$ bind, the platform binding secret, (ii) $CR.K_{po\_auth}$, the platform key used for authenticating data residing in untrusted storage from prior invocations of the instruction set (e.g., previously derived primes for RSA key generation), and (iii) $CR.K_{po}$ code, the platform key used to derive code-specific keys. In all cases, keys are derived via a KDF, which in turn may use pseudo-random functions (e.g., HMAC, CMAC, etc.) as building blocks. Constructions of key derivation functions accepting secret and public parameters are well-known.

During operation of the trusted processor, some software programs include instruction code C that is too large to fit into the SRAM cache or other volatile memory in the trusted processor. In one embodiment, the computing system executes more complex applications by generating a Merkle hash tree over the entire program C including code blocks $C_0 \rightarrow C_n$ and binding the resulting tree to the application state. A loaded code block $C_i$ is accepted if and only if the trusted processor can generate the root of the hash tree using the code block $C_i$.

The hash tree construction provides several benefits. First, the hash tree extends state protection and load-time integrity checking to applications of arbitrary size. Second, the hash tree maintains a small TCB. Third, the hash tree enables efficient execution because code block $C_i$ may be safely executed before the entire application C has been measured.

As described above, in some instances the instruction code C is updated to a new version. To support updates to new versions of the instruction code, the application implements an update command that calls unbind[ ] using the current code version C followed by bind[ ] using the next code version update. The verifier encrypts and authenticates the update with its $K_{VP}$ key (which was transmitted to the trusted processor during the setup protocol via a public-key encryption operation). The update is decrypted into C' and its integrity verified and the CR.PCR and CR.KC are updated. In this way the binding operation binds the state to the new software version C'. The decryption and authentication operations prove to the trusted processor that software is originating from the verifier V as he is the only one in possession of the key $K_{VP}$.

A rollback attack, which is sometimes referred to as a "replay" attack, occurs when the IEE in the trusted processor receives old state for a program instead of receiving the most up to date program state. Since the stale state is cryptographically consistent, an isolated execution environment implemented without rollback prevention will incorrectly accept the old state, which potentially bypasses stateful protection mechanisms to, for example, undo the append-only property of an audit log. Thus, the trusted processor implements rollback resistance to guarantee state continuity of the executing application.

One technique for ensuring state continuity in a trusted processor that does not require the use of non-volatile data memory is described below. During the execution protocol, the unbind[ ] function is invoked to decrypt any state belonging to code C (FIG. 13 block 3). After executing code C, the bind[ ] instruction is invoked to protect state destined for the OS as well as output destined for the verifier. Included in the outputs for the verifier is a summary of the current state, $H(state_{OS})$. The verifier output is encrypted under key $K_{IN}$ before transferring control to untrusted OS code for delivery to the verifier. The verifier includes the aforesaid state summary as an input during the next invocation. If the state presented by the untrusted OS matches the expected state, the code executes and the new state summary is communicated to the verifier as acknowledgement. Otherwise, the protocol aborts. In this fashion, the trusted processor operates with rollback prevention and does not require a non-volatile memory to store persistent state data.

In some embodiments, the trusted processor implements a "quote" operation. In the quote operation, the trusted processor generates a digital signature of the current platform state for use during an attestation process. The quote functionality can be embodied on top of the bind function, or the bind function can be implemented on top of the quote function. In the embodiment where the bind function is implemented atop the quote function, the bind function links program state with data such that only instruction code C can access associated data using the unbind function. Whenever unbind is called, a measurement of the current program state is compared to the expected value before releasing data. The unbind operations aborts if C has an invalid measurement. In another embodiment, the quote functionality is implemented on top of bind by including CR.PCR, which the trusted processor signs using the private platform binding key $K^{-1}_{po\_bind}$, in the verifier results field results V.

FIG. 10 and FIG. 11 are pseudo-code listings of operations that are performed with the trusted processor to initialize an illustrative example of a trusted program that implements a database with searchable encryption. The pseudo-code listing of FIG. 10 is performed once during each session for execution of a software program with the trusted processor. The pseudo-code listing in FIG. 11 is executed one or more times during execution of the software program. In the system described by FIG. 10-FIG. 11, a remote server implements a remote encrypted storage manager application. The remote server is untrusted although the server contains a trusted processor similar to the processors depicted in FIG. 1 and FIG. 2A-FIG. 2B. Each database entry is encrypted independently under a symmetric key bound to the storage manager application, $K_{sym}$. The requestor sends an encrypted query V.input. The storage manager identifies database entries containing the search term and sends the encrypted entries to the requestor.

Given that databases on the order of terabytes or more are commonplace, searchable encryption should permit the requestor to retrieve data without incurring a performance penalty linear to the size of the searched database. To enable fast search, the database entries are organized into data structures that enable sub-linear keyword search algorithms (e.g., tree structures for logarithmic search). Existing searchable encryption schemes enable the return of results in logarithmic time with respect of size of the database while preserving the privacy of the database.

In FIG. 10, the verifier V is configured with a copy of the public platform key, $K^+_{po\_bind}$. Similarly, the verifier can keep a certificate that is used to confirm the authenticity of the public key that receives from the client platform. The verifier has access to the plaintext code. In block 1, the verifier initiates an isolated execution session with the platform. V generates an encryption key $K_{VP}$, a session identifier sessid, and binds the hash of the code with the encryption key $K_{VP}$. Bind enables the verifier to encrypt data using the public part of the platform key while ensuring that the only the correct code running in a correctly setup execution environment can access the data. The inputs along with the code sent to the platform. In block 2, OS calls the launch[ ] function using the plaintext code C, the verifier inputs V.inputs, and the previously stored state OS.input as inputs. In FIG. 10, the initial execution depicts the OS.input state as empty. In block 3, the isolated execution environment IEE checks inputs received from the verifier. If a "setup" command was received from the verifier the IEE attempts to unbind the encrypted inputs from V. The IEE checks the session ID against the hash of the symmetric key returned by unbind[ ]; aborting execution if they do not match. This check prevents unauthorized code from completing the operation. After the checks, the application logic is executed. For example, if the application is a secure counter, during the first iteration the counter is set to zero. In the case of an encrypted database, the first records could be stored in the database or all records could be initialized to zero. Blocks 4 and 5 show the parameters returned to the OS for storage and the verifier, respectively. Similarly, FIG. 11 shows the protocol for subsequent executions of security sensitive application foo( ).

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A method for operating a computing system comprising:
   generating with a trusted processor a first secret cryptographic key based on a physically unclonable function in a volatile cache memory in the trusted processor, the first secret cryptographic key being unavailable to other components in the computing system;
   generating with the trusted processor a first asymmetric cryptographic key pair with reference to the first secret cryptographic key and a predetermined asymmetric cryptographic key generation process, the first asymmetric cryptographic key pair including a first public key and a first private key;
   executing with the trusted processor instruction code stored in the volatile cache memory corresponding to a first software program;
   receiving with the trusted processor input data for the first software program and first authentication data for the input data from an untrusted memory device through an input output (I/O) interface operatively connected to the trusted processor;

executing with the trusted processor the instruction code stored in the volatile cache memory corresponding to the first software program to process the input data and generate output data only in response to verifying with the trusted processor that the input data correspond to the first software program with reference to the first private key and the authentication data;

generating with the trusted processor first encrypted data corresponding to the output data;

generating with the trusted processor second authentication data for the first encrypted data; and transmitting with the I/O interface the first encrypted data and the second authentication data for storage in an untrusted memory.

2. The method of claim 1 further comprising:

receiving with the I/O interface operatively connected to the trusted processor second encrypted data corresponding to a second secret cryptographic key from a verifier computing device that is external to the trusted processor;

decrypting with the trusted processor the second encrypted data corresponding to the second secret cryptographic key with the first private key; and generating with the trusted processor second encrypted data corresponding to the output data with the second cryptographic key; and transmitting with the I/O interface operatively connected to the trusted processor the second encrypted data to the verifier computing device.

3. The method of claim 2 further comprising:

generating with the trusted processor a first hash value of input data received by the trusted processor for the first software program;

generating with the trusted processor a second hash value for program state data of the first software program; and generating with the trusted processor the second encrypted data including encrypted data corresponding to the first hash value and the second hash value using the second secret cryptographic key.

4. The method of claim 1 further comprising:

generating with the trusted processor a hash value corresponding to the instruction code of the first software program;

generating with the trusted processor the second authentication data for the first encrypted data with the first private key as a signature corresponding to the output data and the hash value corresponding to the instruction code of the first software program.

5. The method of claim 1 further comprising:

receiving with the I/O interface operatively connected to the trusted processor the first encrypted data and the second authentication data from the untrusted memory;

verifying with the trusted processor the authentication data corresponding to the encrypted data with reference to the first public key; and generating with the trusted processor decrypted data corresponding to the output data only in response to successful verification of the authentication data.

6. The method of claim 1 further comprising:

generating with the trusted processor a first hash value corresponding to the instruction code of the first software program;

generating with the trusted processor a second secret cryptographic key with reference to the first secret cryptographic key and the first hash value, the second secret cryptographic key being unavailable to other components in the computing system; and generating with the trusted processor the authentication data as a message authentication code corresponding to the encrypted data with reference to the second secret key.

7. The method of claim 6 further comprising:

receiving with the I/O interface operatively connected to the trusted processor the encrypted data and the message authentication code from the untrusted memory;

verifying with the trusted processor the message authentication code with reference to the second secret cryptographic key; and generating with the trusted processor decrypted output data from the encrypted data for the first software program with reference to the second secret cryptographic key only in response to successful verification of the message authentication code.

8. The method of claim 1, the generation of the first secret cryptographic key further comprising:

receiving with the I/O interface operatively connected to the trusted processor seed data that correspond to a user of the computing system; and generating the first secret cryptographic key based on the physically unclonable function of the at least one hardware component and the seed data to generate the first secret cryptographic key for the user that is different from another secret cryptographic key generated in response to different seed data corresponding to another user.

9. The method of claim 1 wherein the trusted processor only stores the first secret cryptographic key, the first private key, and the output data of the first software program prior to encryption in the volatile cache memory in the trusted processor.

10. The method of claim 9 further comprising:

deleting with the trusted processor contents of the volatile cache memory in the trusted processor including the first secret cryptographic key, the first private key, the instruction code corresponding to the first software program, and the output data of the first software program; and operating the trusted processor in an untrusted mode after the deletion.

11. A computing system comprising:

an untrusted memory configured to store data;

an input output (I/O) interface configured to send and receive data from the untrusted memory; and a trusted processor operatively connected to the untrusted memory and the I/O interface, the trusted processor comprising a volatile cache memory and the trusted processor being configured to:

generate a first secret cryptographic key based on a physically unclonable function in the volatile cache memory, the first secret cryptographic key being unavailable to other components in the computing system;

generate a first asymmetric cryptographic key pair with reference to the first secret cryptographic key and a predetermined asymmetric cryptographic key generation process, the first asymmetric cryptographic key pair including a first public key and a first private key;

execute instruction code corresponding to a first software program to generate output data;

generate first encrypted data corresponding to the output data;

generate authentication data for the first encrypted data; and transmit with the input/output (I/O) interface the first encrypted data and the authentication data for storage in the untrusted memory.

12. The system of claim 11, the I/O interface being further configured to:
receive data from and transmit data to a verifier computing device that is external to the trusted processor; and
the trusted processor being further configured to:
receive second encrypted data corresponding to a second secret cryptographic key from the verifier computing device;
decrypt the second encrypted data corresponding to the second secret cryptographic key with the first private key;
generate second encrypted data corresponding to the output data with the second cryptographic key; and
transmit with the I/O interface the second encrypted data to the verifier computing device.

13. The system of claim 12, the trusted processor being further configured to:
generate a first hash value corresponding to input data received by the trusted processor for the first software program;
generate a second hash value corresponding to program state data of the first software program; and
encrypt the first hash value and the second hash value using the second secret cryptographic key for transmission to the verifier computing device through the I/O interface.

14. The system of claim 11, the trusted processor being further configured to:
generate a hash value corresponding to the instruction code of the first software program;
generate the second authentication data for the first encrypted data with the first private key as a signature corresponding to the output data and the hash value corresponding to the instruction code of the first software program.

15. The system of claim 11, the trusted processor being further configured to:
receive with the I/O interface the first encrypted data and the second authentication data from the untrusted memory;
verify the authentication data corresponding to the encrypted data with reference to the first public key; and
generate with the trusted processor decrypted data corresponding to the output data only in response to successful verification of the authentication data.

16. The system of claim 11, the trusted processor being further configured to:
generate a first hash value corresponding to the instruction code of the first software program;
generate a second secret cryptographic key with reference to the first secret cryptographic key and the first message hash value, the second secret cryptographic key being unavailable to other components in the computing system; and
generate with the trusted processor the authentication data as a message authentication code corresponding to the encrypted data with reference to the second secret key.

17. The system of claim 16, the trusted processor being further configured to:
receive with the I/O interface operatively connected to the trusted processor the encrypted data and the message authentication code from the untrusted memory;
verify with the trusted processor the message authentication code with reference to the second secret cryptographic key; and
generate with the trusted processor decrypted output data from the encrypted data for the first software program with reference to the second secret cryptographic key only in response to successful verification of the message authentication code.

18. The system of claim 11, the trusted processor being further configured to:
receive with the I/O interface seed data that correspond to a user of the computing system; and
generate the first secret cryptographic key based on the physically unclonable function of the at least one hardware component and the seed data to generate the first secret cryptographic key for the user that is different from another secret cryptographic key generated in response to different seed data corresponding to another user.

19. The system of claim 11, the trusted processor further comprising:
a volatile memory; and
the trusted processor being further configured to:
only store the first secret cryptographic key, the first private key, and the output data of the first software program prior to encryption in the volatile cache memory.

20. The system of claim 19, the trusted processor being further configured to:
delete contents of the volatile cache memory including the first secret cryptographic key, the first private key, the instruction code corresponding to the first software program, and the output data of the first software program; and
operate in an untrusted mode after the deletion.

* * * * *